UNITED STATES PATENT OFFICE.

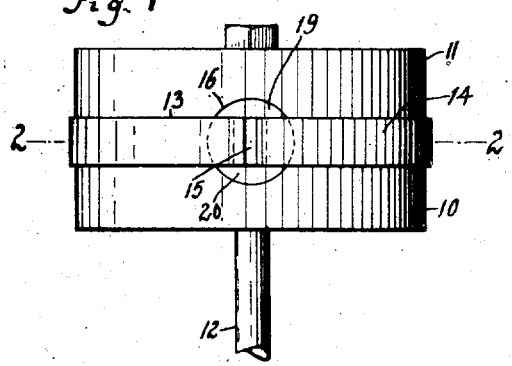
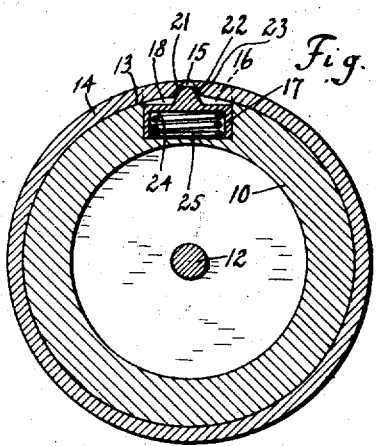
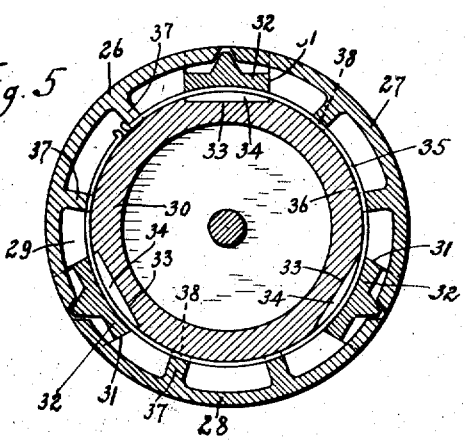

JOSEPH DITTRICH, OF NEW YORK, N. Y.

PISTON-PACKING.

971,978.  Specification of Letters Patent.  Patented Oct. 4, 1910.

Application filed May 18, 1910. Serial No. 562,040.

*To all whom it may concern:*

Be it known that I, JOSEPH DITTRICH, a subject of the King of Hungary, and resident of the city of New York, in the county of New York and State of New York, have invented certain new and useful Improvements in Piston-Packings, of which the following is a specification.

The present invention relates to a packing for the pistons of steam engines, internal combustion engines or compressors, and has for its object to generally improve and simplify the constructions heretofore in use.

Another object of the invention is to provide an efficient joint for preventing the leaking of the fluid pressure past the piston at the joint of the packing rings.

A further object of the invention is to provide a simple and efficient means for preventing the circumferential movement of the piston ring in its groove.

With these and other objects in view which will appear as the nature of the invention is better understood, the same consists in the construction, arrangement and combination of parts hereinafter fully described, pointed out in the appended claim and illustrated in the accompanying drawings, it being understood that various changes may be made in the size, proportion and construction of parts without departing from the spirit or sacrificing any of the advantages of the invention.

The invention is illustrated in the accompanying drawings, in which:—

Figure 1 is a front elevation of a piston provided with a piston ring constructed in accordance with the present invention; Fig. 2 is a section taken on line 2, 2 of Fig. 1; Fig. 3 is a section of the gap closing cylinder of the piston ring; Fig. 4 is a section taken on line 4, 4 of Fig. 3; Fig. 5 is a section of a piston having a modified piston packing thereon; and Fig. 6 is an end view of the gap closing cylinder, shown in Fig. 5 of the drawings.

Referring now more particularly to Figs. 1 to 4, inclusive, of the drawings, the numeral 10 indicates the piston body, usually a cylindrical member, provided with a cover 11, which is attached to said body in a well known manner. The piston rod is indicated at 12. In the peripheral portion of the piston is provided an annular groove 13, in which is seated the piston ring 14, which is split at 15 for obvious reasons. The piston ring is of a slightly larger diameter than the piston 10, whereby this ring will wear leaving the piston itself intact.

In the piston 10 is arranged a cylindrical pocket 16, leading from the groove 13 toward the axis of the piston. Into this pocket fits the gap closing block 17, which is also of cylindrical configuration, and has in its front face, which is curved conforming to the curvature of the inner surface of the cylinder, a recess 18, into which fit snugly the two ends of the piston ring 14. The upper and lower walls 19 and 20 of the recess 18 overlap thereby the gap between the two ends of the piston ring, and prevent thus effectively the passing of the fluid pressure from one head of the piston to the other one. The ends of the piston ring 14 are tapered. The edges 21 and 22 of these ends diverge from the outer periphery of the ring toward the inner periphery of the same. In the space formed by these two edges is arranged a wedge-shaped projection 23, which is located in the recess 18, and is, preferably, made integral with the cylindrical member 17. In the bore 24 of the cylindrical member 17 is located a spring 25, which bears against the said cylindrical member and the piston body.

It will be observed that the projection 23 does not extend to the outer faces 19' and 20' of the upper and lower walls 19 and 20, respectively, and does not contact with the edges 21 and 22 of the piston ring ends, whereby the said wedge 23 does not tend to force the ends of the piston ring away from each other normally.

The operation of the device is as follows: The spring 25 forces the gap closing cylinder into contact with the inner surface of the cylinder, whereby, since the resilient ring is seated in the recess 18 of the gap closing cylinder, the upper and lower walls 19 and 20 of said recess will close the gap between the two ends of the ring, and prevent thus the fluid pressure from passing through said gap from one side of the ring to the other. The wedge-shaped projection 23 of the gap closing cylinder prevents the circumferential movement of the packing ring. The formation of the ridges in the cylinder is prevented since the walls 19 and 20 of the recess 18 are made continuous.

As the faces 19' and 20' of the walls 19 and 20 of the gap closing cylinder wear away, the wedge 23 comes in contact with the edges 22 and 21 of the ends of the piston ring, which latter wears with the faces 19' and 20' above mentioned. The object of this arrangement is to reduce the amount of circumferential movement of the piston ring, which increases in ring constructions of the ordinary type as the ring wears away upon its outer periphery. Since, however, the wedge 23 advances as the outer surface of the gap closing cylinder wears away, the slight circumferential movement of the ring is kept constant.

In Figs. 5 and 6 of the drawings a modification of the device is illustrated. In this case a divided ring is shown, consisting, preferably, of three equal parts 26, 27 and 28, which are seated in the groove 29 in the piston body 30. In this piston body are provided cylindrical pockets 31, similar to those described in connection with the piston shown in Figs. 1 and 2. In the pockets 31 are arranged the gap closing cylinders 32, which differ from those already described only in that the same are not provided with the bores 24, but form solid blocks, in the inner faces 33 of which are cut parallel grooves 34, into which fit the springs 35, which are seated in grooves 36 of the piston body, and extend around the periphery of the same. The piston ring sections are furthermore provided with inwardly extending projections 37, 37, having recesses 38, 38 in the inner faces thereof, which form additional seats for the springs 35.

The operation of the device shown in Figs. 5 and 6 of the drawings is exactly the same as that of the device shown in Figs. 1 to 4, inclusive.

It will be observed that the gap closing blocks, herein described, can be made use of upon stuffing boxes also. In that case, of course, the blocks are arranged in the walls of the stuffing box.

What I claim is:

The combination with a piston having an annular groove in its peripheral portion and a cylindrical pocket leading from said groove toward the axis of said piston, of a split ring seated in said groove, the edges of the ends of said ring diverging from the outer periphery of the same to the inner periphery thereof, a cylindrical member arranged in said pocket and having a recess into which the ends of said piston ring fit, whereby the walls of said recess overlap the gap between the two ends of said piston ring, resilient means between said cylindrical member and said piston for forcing said ring outwardly, and a wedge-shaped projection in said recess and in the space formed between the diverging edges of said ring, said projection being shorter than the walls of said cylindrical member, whereby said projection is normally out of contact with said ring.

Signed at New York, in the county of New York and State of New York, this 14th day of May, A. D. 1910.

JOSEPH DITTRICH.

Witnesses:
SIGMUND HERZOG,
M. FRIEDLANDER.